Nov. 10, 1936.      H. UEBING      2,060,476
SCREW DOWN FOR ROLLING MILLS
Filed May 22, 1934
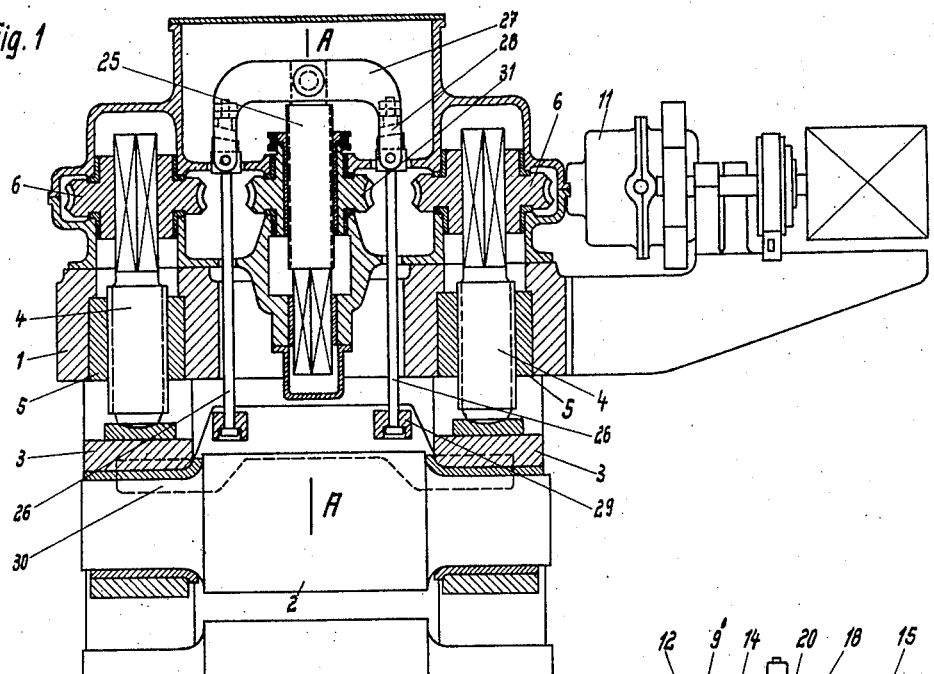
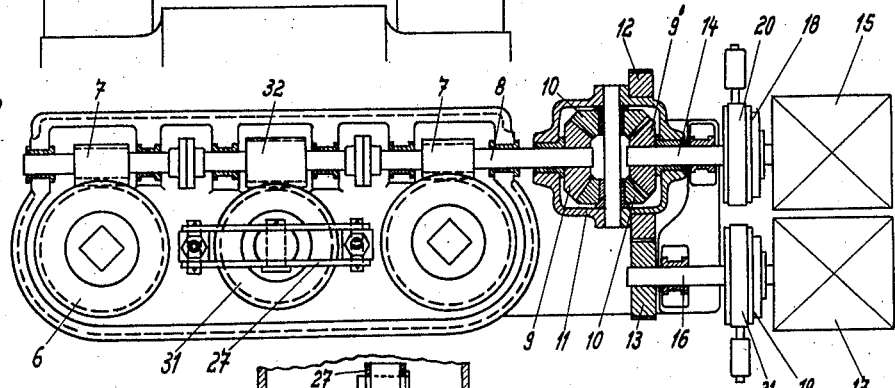
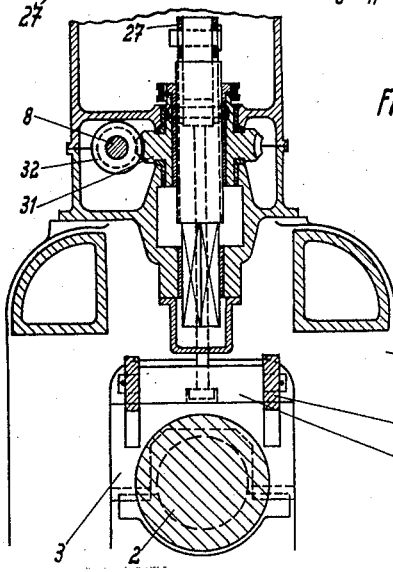
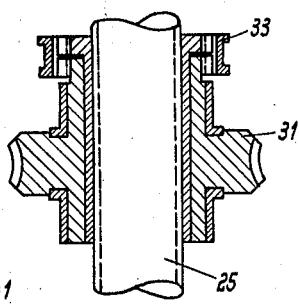
Inventor:
Heinrich Uebing Patented Nov. 10, 1936

2,060,476

UNITED STATES PATENT OFFICE 2,060,476

SCREW DOWN FOR ROLLING MILLS

Heinrich Uebing, Lintorf, Regierungsbezirk Duesseldorf, Germany

Application May 22, 1934, Serial No. 726,904

2 Claims. (Cl. 80—56)

My invention relates to improvements in screw downs for rolling mills, and particularly to screw downs which are adjustable for different speeds.

It has already been proposed to obtain different speeds in a screw down mechanism for rolling mills by revolving the nuts or the spindles of the mechanism or both. The rotation of the nuts has for various reasons several drawbacks which render the above arrangement unfit for practical use.

According to this invention, I provide an improved screw down for rolling mills of the type having a lay shaft common to both spindles which comprises a differential gearing at one end of said shaft and separate means for revolving independently the housing or one of the bevel gears or both together in the same or opposite directions so that four different speeds are available at the lay shaft for raising or lowering the spindles.

With this arrangement, the nuts remain stationary and only the spindles are rotated so that the control of their movements is very simple and easy.

In the Patent 1,537,240 to Lewis, it has already been proposed to use differential gearings in combination with screw downs for rolling mills, but in that case it was for the purpose of moving one spindle of the screw down faster or slower than the other, to correct any deviations of the upper roll from its true horizontal position.

According to another feature of the present invention, I combine with the aforedescribed screw down mechanism means for balancing the upper roll which means is driven from the same lay shaft as the screw down spindles so as to obtain a very simple and rugged structure.

In the appended drawing, in which I have shown one embodiment of my invention by way of illustration Fig. 1 is a sectional elevation through the upper part of a rolling mill equipped with the present screw down mechanism, Fig. 2 a top plan view of the same, Fig. 3 a sectional elevation along the line A—A of Fig. 1, and Fig. 4 a part of Fig 3 on an enlarged scale.

In the drawing, 1 is the housing of a rolling mill, 2 its upper roll and 3 are the bearing boxes supporting roll 2 in the housing, the lower parts of the mill being omitted as they are no part of my invention. The bearing boxes 3 are vertically adjustable by means of a screw down mechanism comprising two rotatable and axially movable screw spindles 4 and nuts 5 fixed to the housing 1. Splined to the spindles 4 are worm gears 6 which are rotated by worms 7 mounted on a lay shaft 8.

At one end of shaft 8, (on the right in Figs. 1 and 2) I provide a differential gearing which includes end bevel gears 9 and 9', intermediate bevel gears 10, and a housing 11 with a gear 12 on it. The latter is in mesh with a pinion 13. Bevel gear 9' is mounted on stub shaft 14 which is driven by motor 15 whereas pinion 13 is mounted on stub shaft 16 driven by motor 17. Clutches 18 and 19 are provided between the two stub shafts and their respective motors. In order to bring the stub shafts to a rest with the motors still running brakes 20 and 21 are associated with those parts of the clutches which are mounted on the stub shafts. The brakes can be applied by any suitable means not shown here.

Depending on whether stub shaft 14 or stub shaft 16 is braked or both shafts are running freely, and that in the same or in opposite directions, four different speeds can be imparted to the lay shaft 8 and thereby to the two screw spindles 4 of the screw down, it being understood that the speeds of the two motors are different. The four different speeds are obtained as follows:

1. The stub-shaft 16 is braked, while stub-shaft 14 rotates, which shaft imparts its rotation to shaft 8.

2. Stub-shaft 14 is braked, while stub-shaft 16 rotates, imparting its rotation to shaft 8.

3. Both stub-shafts rotate in the same direction imparting their rotation to shaft 8 which is rotated with the sum of the speeds of the two stub-shafts.

4. Both stub-shafts rotate in opposite directions, and shaft 8 is rotated with the difference in the speeds of rotation of the two stub-shafts 14 and 16. Thus, I have provided a novel screw down mechanism which is easy to control for four different speeds which may vary over a comparatively wide range. It is obvious that various changes may be made in the construction shown here, without a departure from the spirit of my invention. For example, instead of motors 15 and 17 other driving means may be provided.

The bearing boxes 3 can be supported in the housing by means of rods depending from its top, springs being inserted between those tops and the housing to allow for the vertical displacement of the bearing boxes and the upper roll by means of the screw down mechanism. This arrangement is well known in the art so that further description is not deemed necessary.

In some cases, however, when the vertical displacement is too great as to be taken up by the springs only, means have to be provided for balancing the bearing boxes and the upper roll with regard to the housing. This balancing means is combined with the screw down mechanism so as to obtain a very simple and compact structure.

My novel balancing means comprises a screw spindle 25 and rods 26 depending all from a cross head 27, springs 28 being interposed between the crosshead and the nuts on the rods 26. At the lower end of these rods, I provide a frame-like structure including transverse bars 29 and struts 30, the former being supported by the flanged ends of rods 26 while the latter serve to support the bearing boxes 3. A worm gear 31 is mounted on spindle 25 and threaded inwardly to form a nut for axially displacing that spindle which is held against rotation by its square lower end. A worm 32 mounted on lay shaft 8 is adapted to drive worm gear 31.

In operation, with the rotation of lay shaft 8, the worms 7 and 32 are also rotated and thereby the spindle 25 is raised or lowered, according to the direction of rotation of the lay shaft 8, together with the screw spindles 4 of the screw down mechanism, it being understood that the ratio of the worm gearing and the pitch of the threads are the same for all spindles so that the latter will be moved about equal distances at the same time. So the bearing boxes 3 will always follow the screw down spindles and vice versa.

In case it should be desired to increase the compression of springs 28 it is only necessary to lower the rods 26 without lowering crosshead 27. To accomplish this a coupling 33, (Fig. 4) is provided between worm gear 31 and its inner threaded part 31'. When this coupling has been taken off, rotation of worm gear 31 will not be transmitted to part 31' and thereby spindle 25 and crosshead 27.

Various changes are possible also in this case without a departure from the spirit of my invention.

I claim:

1. In a screw-down mechanism for rolling mills comprising an upper and lower roll, bearing boxes for said upper roll, a pair of spaced axially movable screw-spindles operatively engaging said bearing boxes, a lay-shaft extending across said screw spindles, means operatively connecting said lay-shaft with said screw spindles for rotating them in unison, and means adapted to impart four different speeds to said lay-shaft, said means comprising a differential gearing for driving said lay-shaft, two motors each adapted to independently drive a member of said gearing, said motors being further designed to be operated either singly or simultaneously together in the same direction or in opposite directions, whereby said lay-shaft may be selectively driven either with a speed of one of the driven members of said gearing or with the sum or with the difference of said speeds.

2. The combination as specified in claim 1, including a supporting frame for said bearing boxes, means comprising a non-rotatable axially displaceable spindle operatively connected with said supporting frame, and cooperating means on said spindle and said lay-shaft for axially displacing said spindle.

HEINRICH UEBING.